US011596984B2

(12) United States Patent
Vachon et al.

(10) Patent No.: US 11,596,984 B2
(45) Date of Patent: Mar. 7, 2023

(54) CLEANING VEHICLE AND HIGH PRESSURE CLEANING SYSTEMS

(71) Applicant: OMEGA LIQUID WASTE SOLUTIONS INC., Longueuil (CA)

(72) Inventors: Tony Vachon, St-Joseph-de-Beauce (CA); Henri Jean Bourgeois, Outremont (CA)

(73) Assignee: OMEGA LIQUID WASTE SOLUTIONS INC, Longueuil (CA)

( * ) Notice: Subject to any disclaimer, the term of this patent is extended or adjusted under 35 U.S.C. 154(b) by 0 days.

(21) Appl. No.: 16/342,834

(22) PCT Filed: Nov. 3, 2017

(86) PCT No.: PCT/CA2017/051309
§ 371 (c)(1),
(2) Date: Apr. 17, 2019

(87) PCT Pub. No.: WO2018/081906
PCT Pub. Date: May 11, 2018

(65) Prior Publication Data
US 2019/0255575 A1 Aug. 22, 2019

Related U.S. Application Data

(60) Provisional application No. 62/417,434, filed on Nov. 4, 2016.

(51) Int. Cl.
*B08B 3/14* (2006.01)
*B08B 3/02* (2006.01)
(Continued)

(52) U.S. Cl.
CPC .................. *B08B 3/14* (2013.01); *B08B 3/02* (2013.01); *B08B 9/0495* (2013.01); *B60P 3/225* (2013.01);
(Continued)

(58) Field of Classification Search
CPC .... E03F 7/10; E03F 7/103; E03F 9/00; B08B 3/02; B60P 3/30; B01D 50/002
See application file for complete search history.

(56) References Cited

U.S. PATENT DOCUMENTS 4,783,255 A * 11/1988 Bogusch ............ B01D 21/0051
210/522
5,741,426 A * 4/1998 McCabe ................ B01D 21/16
95/266

(Continued)

FOREIGN PATENT DOCUMENTS

CN     2313921 Y    4/1999
CN     1244447      2/2000
(Continued)

OTHER PUBLICATIONS

CN101824855A Machine Translation (Year: 2010).*

*Primary Examiner* — Spencer E. Bell
(74) *Attorney, Agent, or Firm* — Alexandre Daoust; Norton Rose Fulbright Canada LLP

(57) ABSTRACT

A cleaning vehicle generally has a grey water reservoir having a pre-filter; an aspiration conduit leading into the grey water reservoir upstream from the pre-filter and a vacuum pump adapted to create a vacuum inside the grey water reservoir to draw grey water; a vortex separation subsystem connected downstream from the pre-filter; a filtration bag subsystem connected downstream from the vortex separation subsystem; a filtrate reservoir connected downstream from the filtration bag subsystem; a high pressure hose having an end connected downstream from the filtrate reservoir and another end having a high pressure spray nozzle; a filtrate path extending from the grey water reservoir to the high pressure spray nozzle via the pre-filter, the vortex separation subsystem, the filtration bag subsystem (Continued)

and the high pressure hose; and at least one pump adapted to entrain a flow of fluid along the filtrate path.

16 Claims, 8 Drawing Sheets

(51) Int. Cl.
*B60P 3/22* (2006.01)
*B60P 3/30* (2006.01)
*E03F 7/10* (2006.01)
*E03F 9/00* (2006.01)
*B08B 9/049* (2006.01)

(52) U.S. Cl.
CPC ............... *B60P 3/30* (2013.01); *E03F 7/103* (2013.01); *E03F 7/106* (2013.01); *E03F 9/00* (2013.01); *B08B 2203/0223* (2013.01); *B08B 2203/0229* (2013.01)

(56) References Cited

U.S. PATENT DOCUMENTS

| 9,327,999 | B1 * | 5/2016 | Philbrook | ............ B01D 21/283 |
| 2005/0274094 | A1 | 12/2005 | DeMarco | |
| 2015/0283484 | A1 * | 10/2015 | Vachon | ................ B01D 33/727 |
| | | | | 210/784 |
| 2015/0328566 | A1 * | 11/2015 | Oosthuizen | ........ B01D 21/0042 |
| | | | | 210/322 |

FOREIGN PATENT DOCUMENTS

| CN | 101693152 | | 4/2010 | |
| CN | 101824855 | A | 9/2010 | |
| EP | 0512392 | A1 | 4/1992 | |
| FR | 2742350 | A1 * | 6/1997 | ......... B01D 21/0048 |
| JP | 2008008065 | | 1/2008 | |
| JP | 2012210554 | | 11/2012 | |
| WO | WO-03095754 | A1 * | 11/2003 | ................ E03F 9/00 |
| WO | 2014059539 | A1 | 4/2014 | |

* cited by examiner

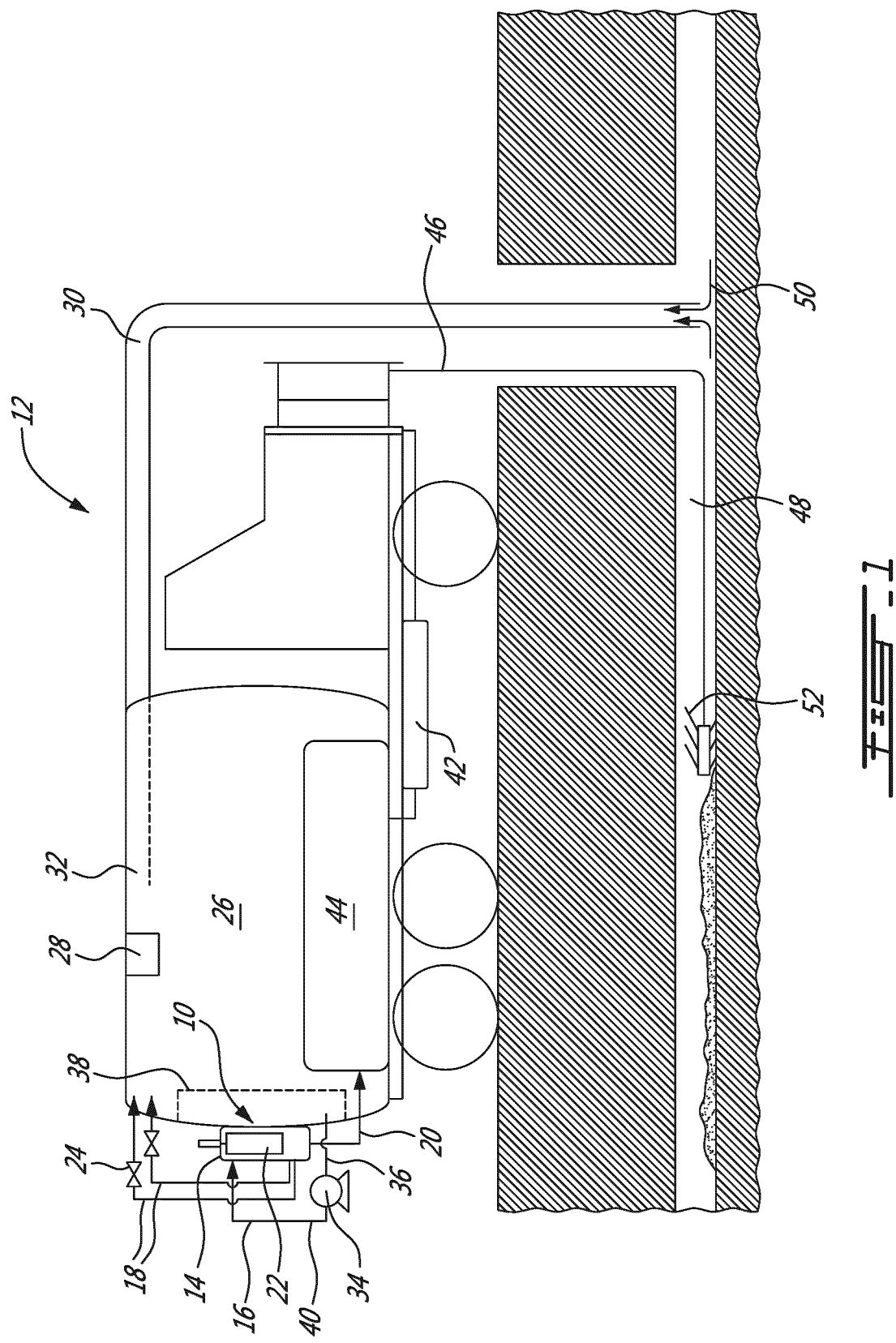

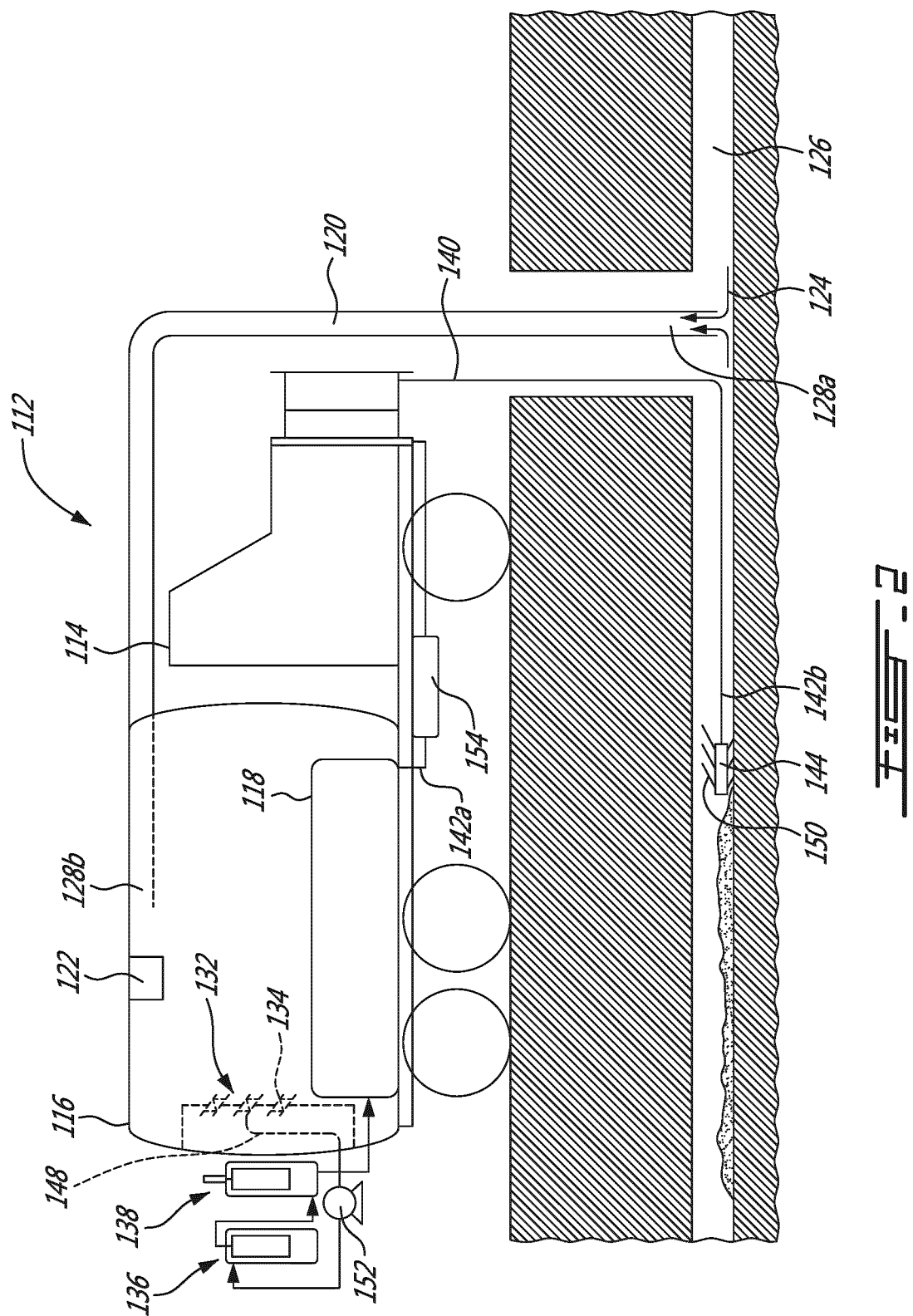

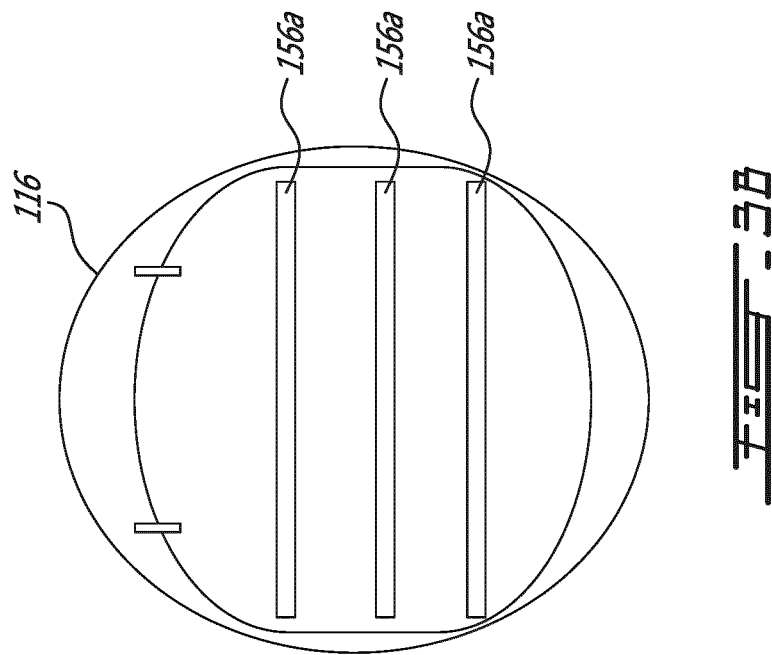
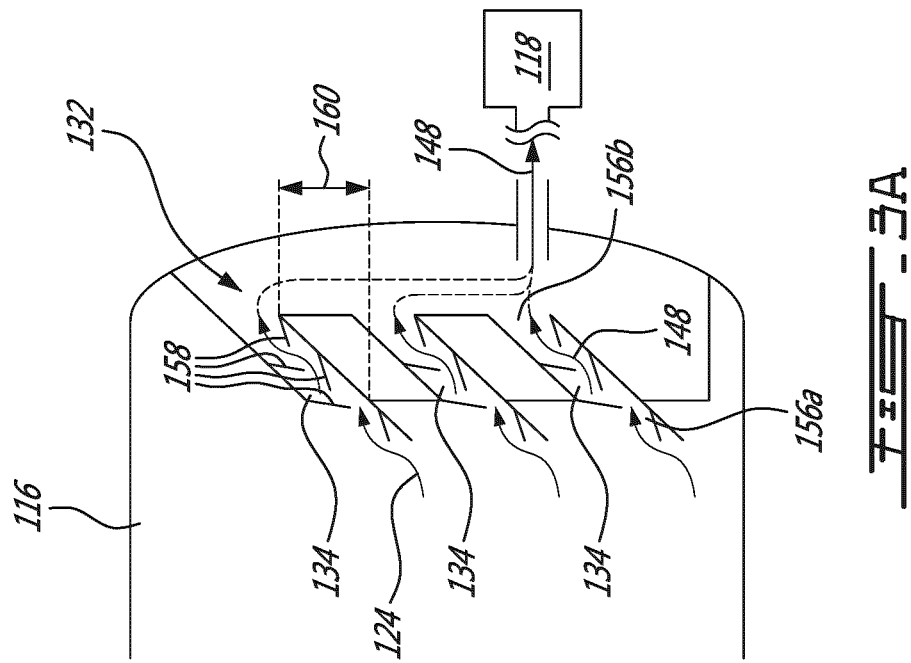

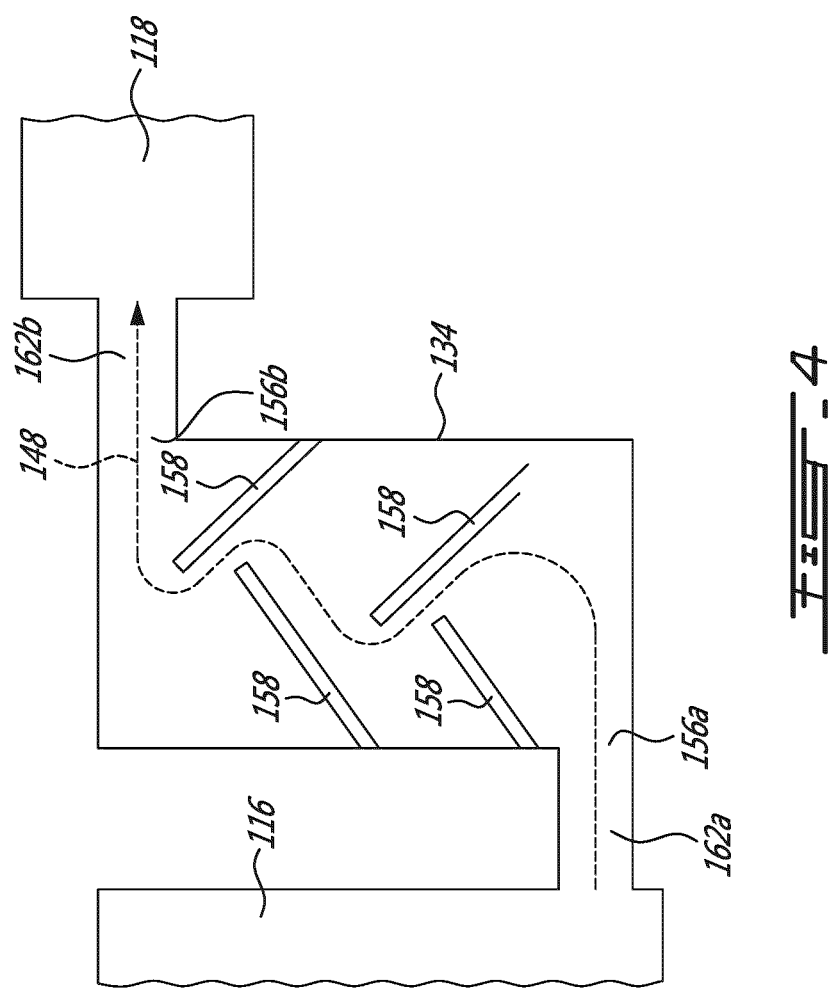

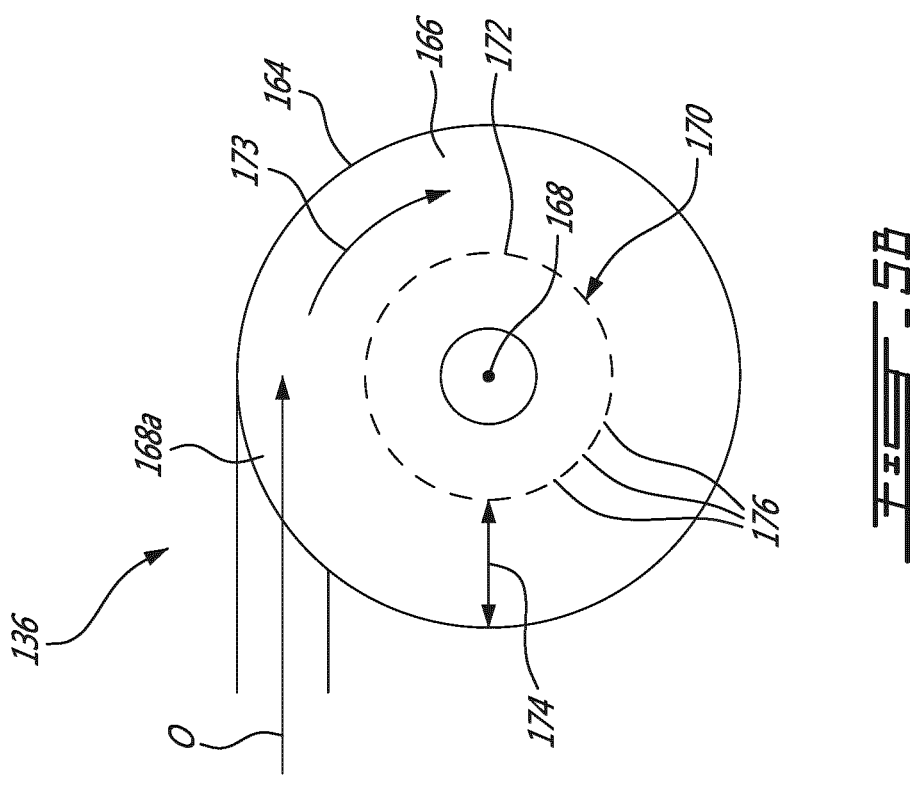
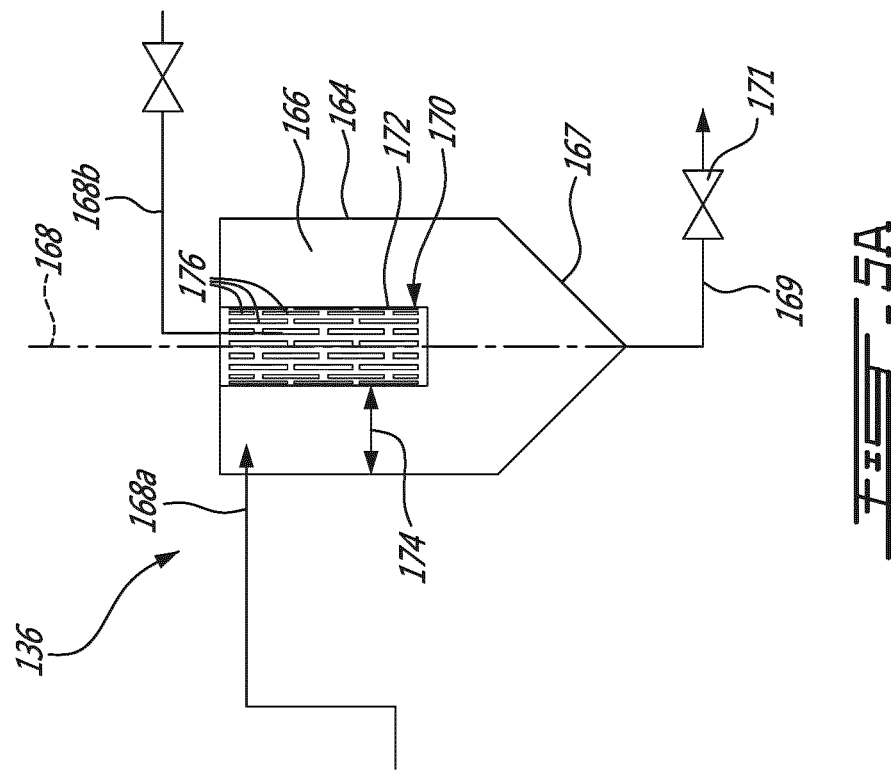

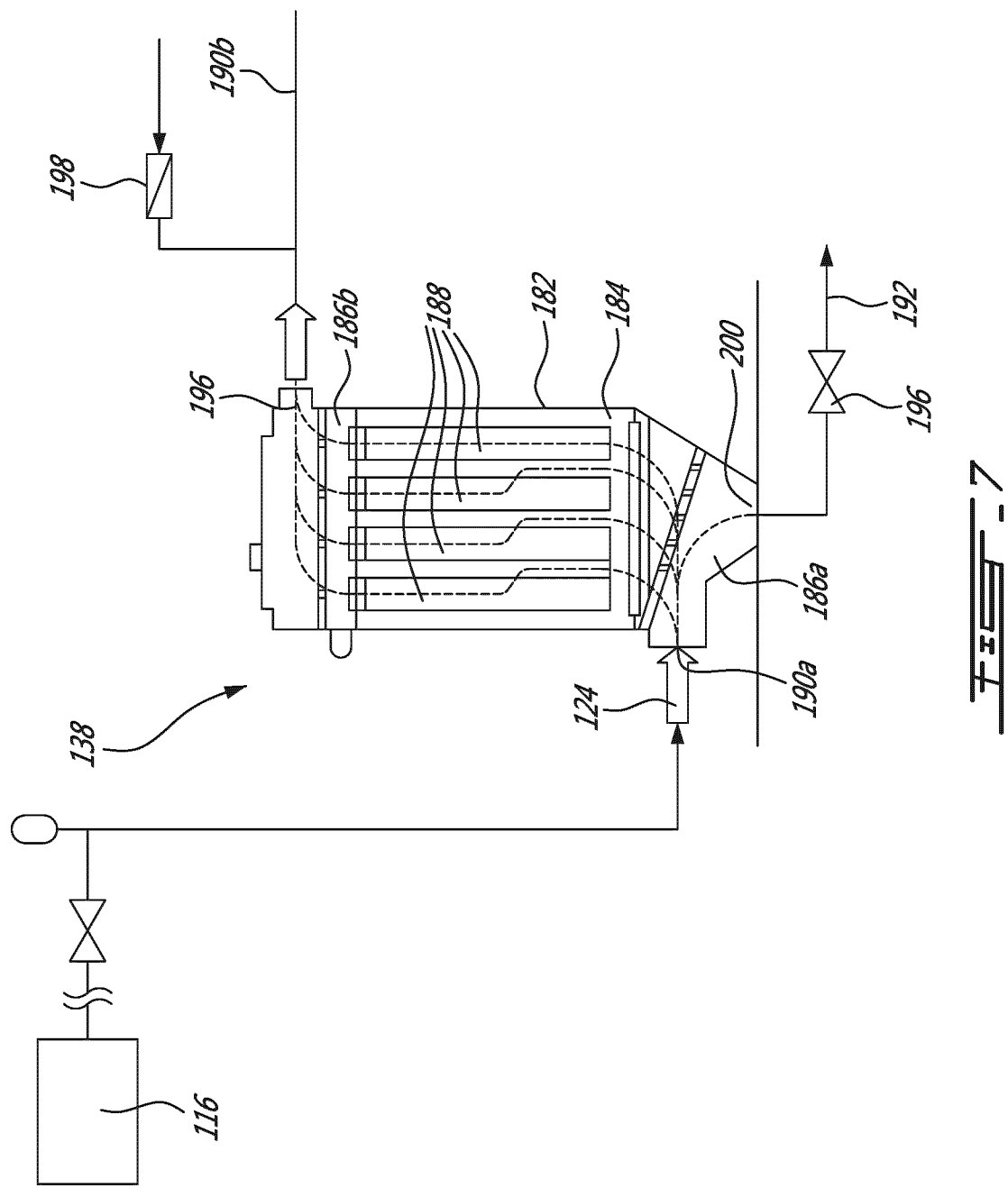

CLEANING VEHICLE AND HIGH PRESSURE CLEANING SYSTEMS

FIELD

The improvements generally relate to filtration systems which separate solid matter from liquid matter, and more particularly to high pressure cleaning systems using such filtration systems.

BACKGROUND

Various forms of filtration techniques exist, and most forms are adapted to specific filtration scenarios. Generally, existing filtration techniques lead to satisfactory results for filtering liquids having a relatively low concentration of non-abrasive and non-fat solids.

For instance, one example of a conventional filtration system 10 for a conventional cleaning vehicle 12 is described in international application publication number WO 2014/059539 A1 and illustrated in FIG. 1. In this example, the conventional filtration system 10 has a housing 14 having a surface of revolution shaped cavity therein defined around an axis, the housing 14 having a tangentially-oriented inlet 16 leading into the cavity in a given tangential direction, purge outlets 18, and a filtrate outlet 20 extending out from the cavity along the axis. The conventional filtration system 10 has a filter element 22 including a filtration membrane and a support membrane, both being apertured, being of a same surface of revolution shape and being mounted concentrically around the axis, with a spacing distance therebetween. The filtration membrane is rotatably mounted to the housing 14 externally to the support membrane which allows rotating of the filtration membrane about the axis with a rotation speed relative to the support membrane. A filtrate path extends from the inlet to the filtrate outlet across the filter element 22 and a purge path extends from the inlet 16 to the purge outlets 18, externally from the filtering element; and a declogging valve 24 operable to temporarily increase a flow rate through the purge outlet 18.

As described in this publication, the conventional cleaning vehicle 12 has a grey water reservoir 26 associated with a vacuum pump 28, an aspiration conduit 30 having an outlet 32 in the grey water reservoir 26, a transfer pump 34 having an inlet 36 connected to a pre-filtration grille 38 located in the grey water reservoir 26 and an outlet 40 connected to the inlet 16 of the conventional filtration system 10. A high pressure pump 42 is also connected between a filtrate reservoir 44 and a high pressure hose 46.

During use, the aspiration conduit 30 is generally provided into a conduit 48 such as a sewage conduit. When the vacuum pump 28 is operated, grey water 50 is drawn from the conduit 48 to fill the grey water reservoir 26 therewith. When the grey water reservoir 26 is filled, or during filling thereof, the grey water 50 can be drawn, by the transfer pump 34, through the pre-filter 38 and into the inlet 16 of the conventional filtration system 10 for filtration thereof. The filtrate is conducted towards the filtrate reservoir 44 via the filtrate outlet 20. Periodically, or as the filter element 22 is detected to be clogged either by a sensor or by an operator, the declogging valve 24 is operated to declog the filter element 22 so that filtration of the grey water can continue. Once the filtrate reservoir 44 is sufficiently filled, the high pressure hose 46 can be provided into the conduit 48, or another conduit, in order to clean it using a high pressure jet of filtrate 52 projected at high velocity upon action of the high pressure pump 42. In such cleaning applications, reducing the amount of solid in the filtrate can prevent the high pressure pump 42, the hose 46 and the conduit 48 to be damaged.

Although the conventional cleaning vehicle 12 is satisfactory to a certain extent, there remains room for improvement, especially in providing improved or alternate filtration techniques adapted to cleaning applications where the solids are present in relatively high concentrations, include a significant amount of fat, fibers or abrasive substances, and/or simply when the solids include a mix of organic and inorganic substances, especially in relation with features such as system costs, filtration efficiency, durability and maintenance costs.

SUMMARY

It was found that not all applications required a sophisticated rotary filtration system such as the one presented with reference to the conventional vehicle 12. Indeed, it was found that, in some cleaning applications, it is desirable to reduce the power requirements of the filtration system that is ultimately imparted on the power supply of the associated vehicle, even sometimes to the cost of filtration efficiency. Accordingly, it was found beneficial to provide a cleaning vehicle having a high pressure cleaning system involving one or more of filtration subsystems connected in series to one another. In some embodiments, at least some of these filtration subsystems require no rotary parts and associated motor and are self-cleaning.

In accordance with one aspect, there is provided a cleaning vehicle comprising: a chassis; a grey water reservoir mounted to the chassis and having a pre-filter; an aspiration conduit leading into the grey water reservoir upstream from the pre-filter and a vacuum pump adapted to create a vacuum inside the grey water reservoir to draw grey water; a vortex separation subsystem connected downstream from the pre-filter; a filtration bag subsystem connected downstream from the vortex separation subsystem; a filtrate reservoir mounted to the chassis and connected downstream from the filtration bag subsystem; a high pressure hose having an end connected downstream from the filtrate reservoir and another end having a high pressure spray nozzle; a filtrate path extending from the grey water reservoir to the high pressure spray nozzle via the pre-filter, the vortex separation subsystem, the filtration bag subsystem and the high pressure hose; and at least one pump adapted to entrain a flow of fluid along the filtrate path such that the high pressure spray nozzle projects a high pressure jet of filtrate.

In accordance with another aspect, there is provided a high pressure cleaning system comprising: a frame; a grey water reservoir mounted to the frame for containing grey water; at least one baffle conduit made integral to the grey water reservoir and having an inlet connected to the grey water reservoir and an outlet, the baffle conduit having at least one baffle; a filtrate reservoir mounted to the frame and connected to the outlet of the at least one baffle conduit; a high pressure hose having an end connected to the filtrate reservoir and another end having a high pressure spray nozzle; and at least one pump mounted to the frame and configured to entrain flow of fluid along a filtrate path extending from the grey water reservoir to the high pressure spray nozzle.

In accordance with another aspect, there is provided a high pressure cleaning system comprising: a frame; a grey water reservoir mounted to the frame for containing grey water; a vortex separation subsystem mounted to the frame and having a housing having a cavity therein defining an axis, a tangentially-oriented inlet receiving grey water leading into the cavity into a vortex direction, and a filtrate outlet extending out from the cavity; and a filter element having a hollow body fixedly mounted inside the housing and concentrically around the axis, with a vortex circulation spacing between the housing and the filter element, the hollow body having a plurality of conduits, the plurality of conduits being at least partially tangentially oblique in a direction contrary to the vortex direction; and a filtrate reservoir mounted to the frame and connected to the filtrate outlet; a high pressure hose having an end connected to the filtrate reservoir and another end having a high pressure spray nozzle; and at least one pump mounted to the frame and configured to entrain flow of fluid along a filtrate path extending from the grey water reservoir to the high pressure spray nozzle.

In accordance with one aspect, there is provided a high pressure cleaning system comprising: a frame; a grey water reservoir mounted to the frame for containing grey water; a filtration bag subsystem mounted to the frame and having a housing having a cavity defined therein, the cavity being divided into a grey water portion and a filtrate portion via a plurality of bag filters mounted to the housing, an inlet receiving the grey water from the grey water reservoir and leading into the grey water portion of the cavity, a declogging outlet leading out of the grey water portion and a filtrate outlet leading out of the filtrate portion of the cavity; a declogging valve mounted along the declogging outlet; an air input valve mounted along the filtrate outlet; a filtrate path extending from the inlet to the filtrate outlet across the plurality of bag filters when the declogging valve and the air input valve are closed; and a declogging path extending from the inlet to the declogging outlet when the declogging valve and the air input valve are open such that solids clogged onto exterior of each one of the bag filters are drawn in the declogging outlet; a filtrate reservoir mounted to the frame and connected to the filtrate outlet; a high pressure hose having an end connected to the filtrate reservoir and another end having a high pressure spray nozzle; and at least one pump mounted to the frame and configured to entrain flow of fluid along a filtrate path extending from the grey water reservoir to the high pressure spray nozzle.

In accordance with one aspect, there is provided a high pressure cleaning system comprising: a frame; a grey water reservoir mounted to the frame for containing grey water; a filtration subsystem having an inlet connected to the grey water reservoir and a filtrate outlet; a filtrate reservoir mounted to the frame and connected to the filtrate outlet of the filtration subsystem; a settling structure mounted inside the filtrate reservoir; a high pressure hose having an end connected to the filtrate reservoir and another end having a high pressure spray nozzle; and at least one pump mounted to the frame and configured to entrain flow of fluid along a filtrate path extending from the grey water reservoir to the high pressure spray nozzle.

Many further features and combinations thereof concerning the present improvements will appear to those skilled in the art following a reading of the instant disclosure.

DESCRIPTION OF THE FIGURES

In the figures,

FIG. 1 is a schematic view of an example of a cleaning vehicle, in accordance with prior art;

FIG. 2 is a schematic view of an example of a cleaning vehicle, in accordance with an embodiment;

FIG. 3A is a schematic side view of exemplary baffle conduits of the cleaning vehicle of FIG. 2, in accordance with an embodiment;

FIG. 3B is a schematic front view of the exemplary baffle conduits of FIG. 3A;

FIG. 4 is a schematic side view of another example of a baffle conduit, in accordance with an embodiment;

FIG. 5A is a schematic side view of an example of a vortex separation subsystem of the cleaning vehicle of FIG. 2, in accordance with an embodiment;

FIG. 5B is a schematic top plan view of the vortex separation subsystem of FIG. 5A;

FIG. 7 is a schematic view of an example of a filtration bag subsystem of the cleaning vehicle of FIG. 2, in accordance with an embodiment;

DETAILED DESCRIPTION

Figure 6A:
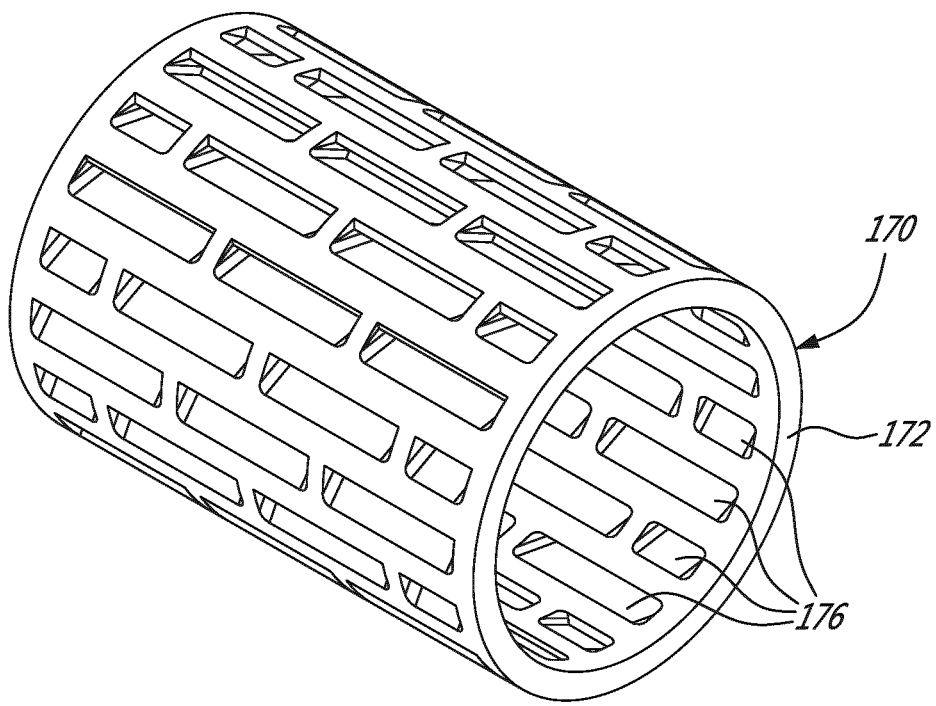
FIG. 6A is an oblique view of a filter element of the vortex separation subsystem of FIG. 5A.

FIG. 2 shows an example of a cleaning vehicle 112, in accordance with an embodiment. As depicted, the cleaning vehicle 112 has a chassis 114 to which are mounted a grey water reservoir 116 and a filtrate reservoir 118. Other components can be mounted either directly or indirectly to the chassis 114, as will become apparent for the skilled reader.

The cleaning vehicle has a high pressure cleaning system having a high pressure hose 140 having one or more water jets at its end 144. The cleaning vehicle is adapted to recover and re-use water used by the high pressure cleaning system in order to extend its autonomy. However, high pressure components such as the high pressure pump leading to the high pressure hose can be sensitive to debris or impurities in the water, and a filtration subsystem is thus used between the grey water reservoir 116 and the high pressure components to provide suitably 'pure' recycled water thereto.

In this specific embodiment, an aspiration conduit 120 and a vacuum pump 122 are used to fill the grey water reservoir 116 with grey water 124 from a conduit 126. More specifically, the aspiration conduit 120 has a first end 128a extending into the conduit 126 and a second end 128b leading into the grey water reservoir 116. The vacuum pump 122 is used to create a vacuum inside the grey water reservoir 116 which can cause aspiration of grey water 124 from the conduit 126 to the grey water reservoir 116.

As shown, the grey water reservoir 116 has a pre-filter 132 connected downstream from the second end 128b of the aspiration conduit 120. The pre-filter 132 can be provided in the form of a baffle conduit 134, which will be described in detail below with reference to FIGS. 3A-B and 4, a grille or any other suitable pre-filter to prevent at least some solids from leaving the grey water reservoir 116 further downstream. The cleaning vehicle 112 also has a vortex separation subsystem 136 connected downstream from the pre-filter 132, a filtration bag subsystem 138 connected downstream from the vortex separation subsystem 136 and upstream from the filtrate reservoir 118, all of which will be described in the following paragraphs. For ease of reading, the fluid which is directed in a given filtration subsystem is referred to as "grey water" whereas the fluid exiting from the given filtration subsystem is referred to as "filtrate".

The high pressure hose 140 is connected ultimately to the filtrate reservoir 118 and has a jet end 142b positionable into the conduit 126 for cleaning thereof. More specifically, in this example, a high pressure spray nozzle 144 is provided to the second end 142b of the high pressure hose 140.

As can be understood, the cleaning vehicle 112 has a filtrate path 148 extending from the grey water reservoir 116 to the high pressure spray nozzle 144 via the pre-filter 132, the vortex separation subsystem 136, the filtration bag subsystem 138 and the high pressure hose 140. Accordingly, upon operation of one or more pump, a flow of fluid is entrained along the filtrate path 148 so that a high pressure jet of filtrate 150 can be projected from the high pressure spray nozzle 144 for cleaning internal walls of the conduit 126.

In this example a transfer pump 152 is provided downstream from the pre-filter 132 and upstream from the vortex separation subsystem 136 and a high pressure pump 154 is provided downstream from the first end 142a of the high pressure hose 140 and upstream from the second end 142b of the high pressure hose 140. Although the transfer pump 152 and the high pressure pump 154 are used in this embodiment, it is intended that only one pump can be connected along the filtrate path 148 in other embodiments and, alternately, that more than two pumps can be provided along the filtrate path 148 in some other embodiments.

FIGS. 3A and 3B show an example of a pre-filter 132 including three baffle conduits 134 made integral to the grey water reservoir 116, in accordance with an embodiment. Even though this embodiment shows that three baffle conduits are used, it is understood that other embodiments can have one, two, or more than three baffle conduits.

As depicted, each baffle conduit 134 has an inlet 156a connected to the grey water reservoir 116 and an outlet 156b either directly or indirectly connected to the filtrate reservoir 118. Also, each baffle conduit 134 has at least one baffle 158. In the illustrated embodiment, each baffle conduit 134 has 5 baffles 158 inclined against the filtrate path 148, however, other embodiments can have a different quantity of baffles 134 and still provide satisfactory results. The design of the baffles 134 and of the corresponding baffle conduits 134 can vary from an embodiment to another. For instance, the baffles 158 can be provided in the form of plates partially inwardly projecting from an inside wall of the baffle conduit 134. As can be understood, the filtrate path 148 extends around the baffles 158 which can tend to increase the turbulence of the grey water 124 and, in turn, cause at least some solids of the grey water 124 to settle in the grey water reservoir 116.

Referring to FIG. 3A, it can be seen that the inlets 156a are at a lower portion of the grey water reservoir 116 and that the outlets 156b are at an upper portion relative to the lower portion. More specifically, a vertical spacing distance 160 can be seen between the lower portion and the upper portion. Accordingly, the baffle conduits 134 can extend obliquely between the inlets 156a and the corresponding outlets 156b. In this embodiment, such an orientation of the baffle conduits 134 can help prevent at least some solids of the grey water 124 to reach the corresponding outlets 156b. As best seen in FIG. 3B, the inlets 156a of the baffle conduits extend horizontally over a given width of the grey water reservoir 116.

Although the baffle conduits 134 are shown to be provided inside the grey water reservoir 116 in FIG. 3A, other examples of baffle conduits can be made integral to the grey water reservoir 116 but externally thereof. For instance, FIG. 4 shows another example of such a baffle conduit 134 having an inlet 156a connected to the grey water reservoir 116 via a first intermediate conduit 162a and an outlet 156b connected to the filtrate reservoir 118 via a second intermediate conduit 162b. In this example, instead of being inclined against the filtrate path 148, the baffles 158 are inclined along the filtrate path 148, which can also provide acceptable results.

FIGS. 5A and 5B show an example of the vortex separation subsystem 136, in accordance with an embodiment. As illustrated, the vortex separation subsystem 136 has a housing 164 having a cylindrical cavity 166 therein defining an axis 168, a tangentially-oriented inlet 168a receiving the grey water 124 from the pre-filter 132 of the grey water reservoir 116 and leading into the cylindrical cavity 166 into a vortex direction 173, and a filtrate outlet 168b extending out from the cylindrical cavity 166. The housing 164 can have a tapering bottom shape 167 leading to a bypass outlet 169, and associated valve 171, to remove at least some solids accumulated in the bottom of the housing 164 when needed. The bypass outlet 169 can be connected back to the grey water reservoir, or to a sludge reservoir (not shown), for instance. The adjustment of the valve 171 can be used to select the amount of fluid which is bypassed relative to the amount of filtrate, in an attempt to optimize the operation with a view of satisfactory filtration results with a limited amount of bypass flow.

As can be understood, in this embodiment, the inlet 168a is oriented tangentially with respect to the axis 168 and therefore, the flow rate into the cylindrical cavity 166 imparts a circular motion around the axis 168. The circular motion, referred to herein as the rotary fluid movement, or vortex, imparts a centrifugal acceleration to the solids in the liquid which can separate the solids from the liquid. The fact that the cylindrical cavity 166 is of solid of revolution shape and has a smooth surface assists in allowing the establishment of the vortex inside the cylindrical cavity 166. In this embodiment, the solid of revolution shape is a cylinder, though it will be understood by persons of skill in the art reading this disclosure that solid of revolution shapes having a conical aspect, a spherical aspect, a combination of conical, cylindrical and/or spherical aspects, etc., could be satisfactory as well depending on the application. To clarify, if need be, what is meant by same tangential direction, reference is made to FIG. 5B. An axial orientation can be defined as parallel to the axis 168, a radial orientation can be defined as being normal to the axis 168, and a tangential orientation can be defined as being normal to both the radial orientation and the axial orientation at any spatial coordinate. In FIG. 5B, the inlet flow 0 represents the tangential orientation, and tangential direction of the inlet 168a.

Figure 6B:
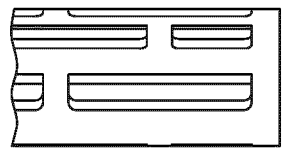
FIG. 6B is a fragmented side elevation view of the filter element of FIG. 6A.
Figure 6C:
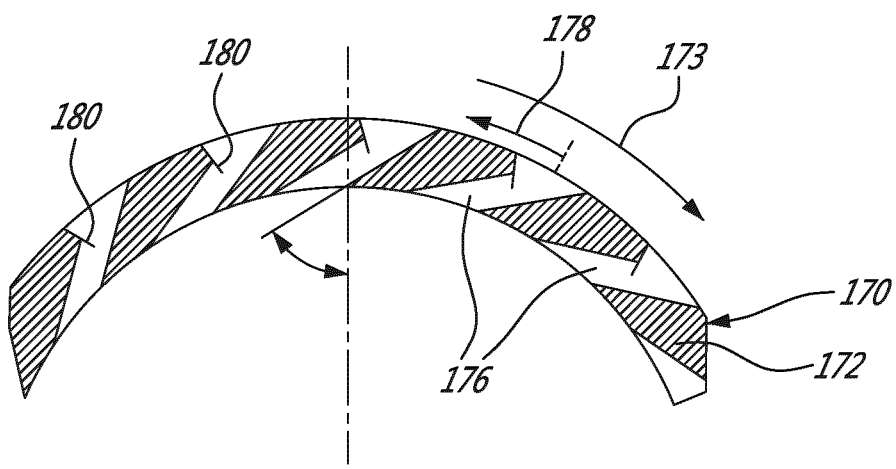
FIG. 6C is a fragmented top plan view of the filter element of FIG. 6A.

A filter element 170, best seen in FIGS. 6A-C, is used to assist the separation function. The filter element 170 has a cylindrical hollow body 172 fixedly mounted inside the housing 164 and concentrically around the axis 168, with a vortex circulation spacing 174 between the housing 164 and the filter element 172. The cylindrical hollow body 172 has a plurality of conduits 176 wherein the conduits 176 are at least partially tangentially oblique in a direction 178 contrary to the vortex direction 170. In this way, the conduits 176 can prevent at least some solids of the grey water 124 to penetrate inside the cylindrical hollow body 172 and reach the filtrate outlet 168b. As can be seen in FIG. 6A, the conduits 176 are provided in the form of axially-extending slots which are circumferentially distributed around the cylindrical hollow body 172.

Referring now to FIG. 6C, in this embodiment, each of the conduits 176 have a broad inlet port on a radially-outer face, and a narrower outlet port on a radially-inner face. Moreover, the conduits are provided with one or more baffle 180 at a radially outer end thereof. As can be understood, use of the baffles 180 can help further prevent at least some solids of the grey water 124 to penetrate inside the cylindrical hollow body 172 and reach the filtrate outlet 168b.

FIG. 7 shows an example of the filtration bag subsystem 138, in accordance with an embodiment. As depicted, the filtration bag subsystem 138 has a housing 182 having a cavity 184 defined therein. A fabric filter, embodied here in the form of a plurality of bag filters 188, is mounted to the housing 182, and separate the cavity 184 into two portions which will be referred to herein as a grey water portion 186a and a filtrate portion 186b. The filtration bag subsystem 138 has an inlet 190a receiving the grey water 124 either directly or indirectly from the grey water reservoir 116 and leading into the grey water portion 186a of the cavity 184, a declogging outlet 192 leading out of the grey water portion 186a and a filtrate outlet 190b leading out of the filtrate portion 186b of the cavity 184. As can be seen, a declogging valve 196 is mounted along the declogging outlet 192 and an air input valve 198 is mounted along the filtrate outlet 190b.

During filtration mode, the declogging valve 196 and the air input valve 198 are closed, and a filtrate path 196 extends from the inlet 190a to the filtrate outlet 190b across the bag filters 188. The filtration bag subsystem can also be operated in declogging mode. In declogging mode, the declogging valve 196 and the air input valve 198 are open, and air is allowed to blow across the filter bags in a reverse direction such that solids clogged onto exterior of the bag filters 188 are removed and drawn outside the housing via the declogging outlet 192. As can be understood, the declogging outlet 192 can lead back to the grey water reservoir, or to a sludge reservoir (not shown), for instance.

If the declogging outlet 192 leads back to the grey water reservoir, and the declogging valve 196 and the air valve 198 are open while there is a vacuum in the grey water reservoir, the vacuum of the grey water reservoir can be used to aspire air across the filter bags and aspire air and debris into the grey water reservoir. Alternately, an air pump can be associated with the air inlet to provide positive pressure. The water flow into the inlet 190a can be completely stopped during declogging operation. Alternately, the water flow can be partially maintained, or fully maintained, as found suitable to the exact circumstances.

In this embodiment, a pressure sensor is mounted to the housing to detect internal pressure. The declogging valve 196 and the air input valve 198 are configured to open when the pressure inside the housing 184 is detected to be above a pressure threshold so as to self-clean when the bag filters 188 are clogged to a certain extent. The pressure threshold can be set in a manner to represent a suitable amount of clogging of the filter bags, above which declogging becomes desirable.

Figure 8:
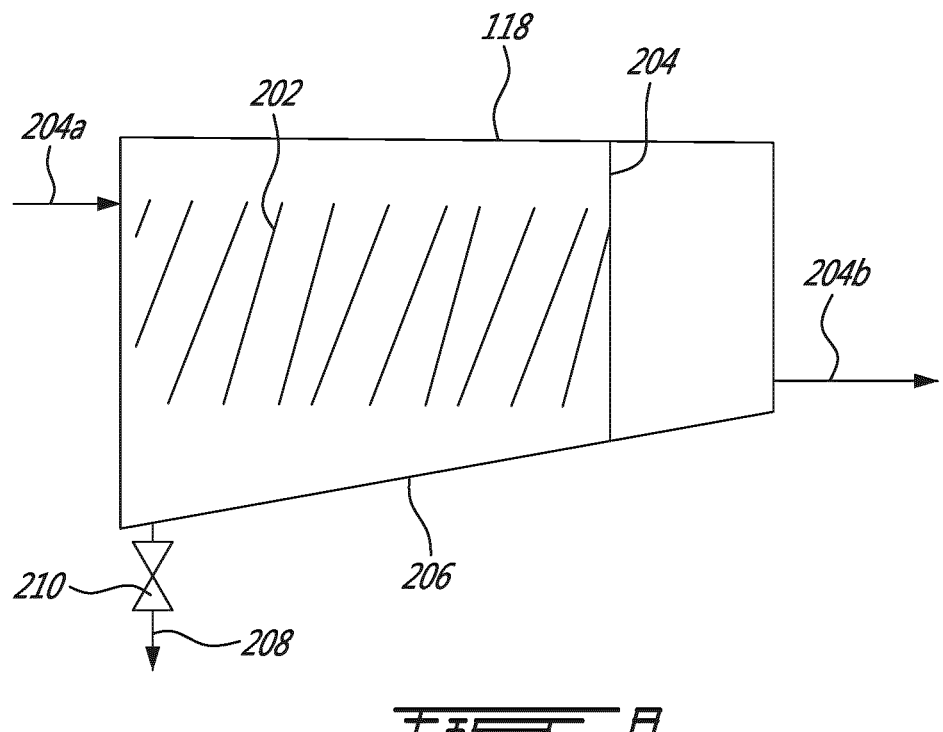
FIG. 8 is a schematic view of an example of a filtrate reservoir enclosing a settling structure, in accordance with an embodiment.
Figure 9:
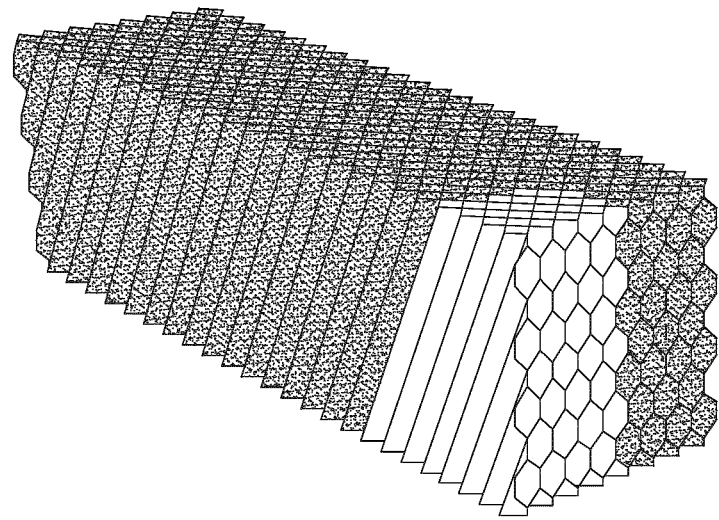
FIG. 9 is an oblique view of tube settlers usable as the settling structure of FIG. 8.

FIG. 8 shows an example of a filtrate reservoir 118, in accordance with an embodiment. As depicted, the filtrate reservoir 118 has a settling structure 202 mounted inside the filtrate reservoir 118. Depending on the embodiment, the settling structure 202 can be embodied by tube settlers such as shown in FIG. 9, lamella settlers or any other suitable settling structure. Generally, the settling structure 202 has plates or tubes extending obliquely in the filtrate reservoir 118. One function of the settling structure is to prevent fluid velocities at an inlet 204a of the filtrate reservoir 118 from extending into the filtrate reservoir 118, which can favor settling of at least some solids.

As can be seen, the filtrate reservoir 118 can be provided with a post-filter 204 such as a grille or a baffle conduit which can offer an additional opportunity for solid particles to settle in the filtrate reservoir 118 between the settling structure 202 and the outlet 204b.

The filtrate reservoir 118 can have a tapering bottom shape 206 leading to an outlet 208, and associated valve 210, to remove at least some solids accumulated in the bottom of the filtrate reservoir 118 when needed. The sludge outlet 208 can be connected to a sludge reservoir (not shown) fixedly mounted relative to the filtrate reservoir 118.

As can be understood, the baffle conduit of FIGS. 3A-B, the vortex separation subsystem of FIGS. 5A-B, the filtration bag subsystem of FIG. 7 and the settling structure of FIG. 8 have been described as being part of the cleaning vehicle 12, however, it is intended that they can be provided separately or in combination in any suitable high pressure cleaning system.

As can be understood, the examples described above and illustrated are intended to be exemplary only. For instance, the specific combination of elements is exemplary and can vary in alternate embodiments. Moreover, the high pressure cleaning system can be mounted to another form of frame than a chassis, and be used in other applications than the cleaning vehicle example described above. The scope is indicated by the appended claims.

What is claimed is:
1. A cleaning vehicle comprising:
a chassis;
a grey water reservoir mounted to the chassis and having a pre-filter;
an aspiration conduit leading into the grey water reservoir upstream from the pre-filter and a vacuum pump adapted to create a vacuum inside the grey water reservoir;
a filtration subsystem having a vortex separation subsystem connected downstream from the pre-filter and a fabric filter connected downstream from the vortex separation subsystem;
a filtrate reservoir mounted to the chassis and connected downstream from the filtration subsystem;
a high pressure hose having an end connected downstream from the filtrate reservoir and another end having a high pressure spray nozzle;
a filtrate path extending from the grey water reservoir to the high pressure spray nozzle via the pre-filter, the filtration subsystem and the high pressure hose; and
at least one pump adapted to entrain a flow of fluid along the filtrate path such that the high pressure spray nozzle projects a high pressure jet of filtrate;
wherein the pre-filter includes at least one baffle conduit made integral to the grey water reservoir and having an inlet connected to the grey water reservoir and an outlet vertically offset from the inlet connected to the filtrate reservoir, the outlet offset above the inlet by a vertical spacing distance, the baffle conduit extending obliquely from the inlet and having baffles forming a chicane filtrate path therein,
wherein the baffles are longitudinally staggered along the baffle conduit and alternatingly projecting from opposite inside walls of the baffle conduit, the baffles all projecting toward the inlet;

wherein the prefilter defines an outlet of the grey water reservoir downstream of the at least one baffle conduit outlet, the outlet of the grey water reservoir connected to the vortex separation subsystem.

2. The cleaning vehicle of claim 1 wherein the vortex separation subsystem includes a housing having a cylindrical cavity therein defining an axis, a tangentially-oriented inlet receiving grey water leading into the cylindrical cavity into a vortex direction, and a filtrate outlet extending out from the cylindrical cavity; and a filter element having a cylindrical hollow body fixedly mounted inside the housing and concentrically around the axis, with a vortex circulation spacing between the housing and the filter element, the cylindrical hollow body having a plurality of conduits, the plurality of conduits being at least partially tangentially oblique in a direction contrary to the vortex direction.

3. The cleaning vehicle of claim 1 further comprising a housing having a cavity defined therein, the cavity being divided into a grey water portion connected to the vortex separation subsystem and a filtrate portion leading downstream along the filtrate path, wherein the fabric filter is provided in the form of a plurality of bag filters mounted to the housing and separating the grey water portion of the cavity from the filtrate portion of the cavity.

4. The cleaning vehicle of claim 3, wherein the housing further comprises a declogging outlet leading out of the grey water portion and a filtrate outlet leading out of the filtrate portion of the cavity; further comprising a declogging valve associated with the declogging outlet and an air input valve connected to the filtrate outlet.

5. The cleaning vehicle of claim 4, wherein the declogging valve is connected to the grey water reservoir.

6. The cleaning vehicle of claim 4, further comprising a valve between the vortex separation subsystem and the grey water portion, the valve being closable fully or partially when the declogging valve and the air input valve are open.

7. The cleaning vehicle of claim 1 wherein the filtrate reservoir includes a settling structure mounted inside the filtrate reservoir.

8. The cleaning vehicle of claim 7, wherein the settling structure is a plurality of lamella settlers extending obliquely within the filtrate reservoir.

9. The cleaning vehicle of claim 7, wherein the settling structure is a plurality of tube settlers extending obliquely within the filtrate reservoir.

10. The cleaning vehicle of claim 9, wherein the settling structure includes a post-filter downstream of the tube settlers.

11. The cleaning vehicle of claim 10, wherein the post-filter includes a baffle conduit.

12. The cleaning vehicle of claim 10, wherein the settling structure includes a tapering bottom shape leading to a settling structure outlet.

13. The cleaning vehicle of claim 1 wherein the at least one pump includes a single pump connected along the filtrate path.

14. The cleaning vehicle of claim 1 wherein the at least one pump includes a transfer pump connected downstream from the pre-filter and upstream from the vortex separation subsystem and a high pressure pump connected downstream from the filtrate reservoir.

15. The cleaning vehicle of claim 1, wherein the baffles are projecting plates.

16. The cleaning vehicle of claim 1, wherein the baffles overlap transversally within the baffle conduit.

* * * * *